(12) United States Patent
Trossen

(10) Patent No.: US 7,187,931 B2
(45) Date of Patent: Mar. 6, 2007

(54) HANDOVER OF MOBILE NODE TO A NEW ACCESS ROUTER

(75) Inventor: Dirk Trossen, Cambridge, MA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/669,571

(22) Filed: Sep. 25, 2003

(65) Prior Publication Data

US 2004/0166861 A1    Aug. 26, 2004

Related U.S. Application Data

(60) Provisional application No. 60/448,101, filed on Feb. 20, 2003.

(51) Int. Cl.
*H04Q 7/20* (2006.01)
*H04Q 7/38* (2006.01)

(52) U.S. Cl. ............... 455/440; 455/436; 455/438; 455/439; 455/422.1; 455/403; 455/432.1; 455/437; 370/351; 370/389; 370/395.2; 370/395.3

(58) Field of Classification Search ............... 455/403, 455/422.1, 432.1, 436–440, 414.1, 414.2, 455/517, 550.1, 500, 466, 435.1, 435.2, 435.3, 455/445; 370/331, 351, 389, 395.2, 395.3
See application file for complete search history.

(56) References Cited

U.S. PATENT DOCUMENTS

2001/0044305 A1* 11/2001 Reddy et al. ............... 455/436
2002/0068570 A1* 6/2002 Abrol et al. ................ 455/438
2002/0097719 A1    7/2002 Chaskar et al.
2002/0122432 A1    9/2002 Chaskar
2002/0191627 A1* 12/2002 Subbiah et al. ............. 370/428
2003/0091021 A1    5/2003 Trossen et al.
2003/0210674 A1* 11/2003 Honkasalo et al. ......... 370/338
2004/0092264 A1* 5/2004 Koodli et al. .............. 455/436
2004/0203783 A1* 10/2004 Wu et al. ................... 455/436

FOREIGN PATENT DOCUMENTS

WO       03003639       1/2003

OTHER PUBLICATIONS

Trossen et al., "A Dynamic Protocol For Candidate Access-Router Discovery", draft-Trossen-Seamoby-dycard-00.txt, Oct. 25, 2002, pp. 1-48.
Trossen et al., "Issues in Candidate Access Router Discovery For Seamless IP-Level Handoffs", Oct. 16, 2002, pp. 1-9.

* cited by examiner

*Primary Examiner*—Keith Ferguson
(74) *Attorney, Agent, or Firm*—Squire, Sanders & Dempsey, LLP.

(57) ABSTRACT

A method and apparatus are provided for handing over a mobile node from a first access router to a second access router. This may include moving a mobile node from a first geographic location associated with the first access router to a second geographic location associated with the second access router. A request message may then be sent from the second access router to the mobile node. A connectivity report may then be sent from the mobile node to the second access router.

36 Claims, 4 Drawing Sheets

HANDOVER OF MOBILE NODE TO A NEW ACCESS ROUTER

This application claims priority from U.S. Provisional Application No. 60/448,101, filed Feb. 20, 2003, the subject matter of which is incorporated herein by reference.

FIELD OF THE INVENTION

The present disclosure relates to telecommunication networks. More particularly, the present disclosure relates to handover of a mobile node to a new access router.

BACKGROUND

Telecommunication networks for mobile devices generally allow mobile devices to move geographically by "handing off" localized communication links among transmission towers and associated base stations. For example, such networks allow Internet Protocol-enabled devices such as wireless Personal Digital Assistants (PDAs) and mobile terminals and computers to move about geographically dispersed areas while maintaining a connection to the Internet.

As is well known, mobile terminals can be served by one or more access routers (ARs) that serve terminals within a particular area. Such access routers allow the mobile terminals to access one or more networks, such as the Internet, using mobile IP protocols or other protocols. Mobile terminals may communicate using one of various access technologies, such as GPRS, Bluetooth, WLAN, or others.

Mobile IP enables a mobile node (MN) to execute IP-level handovers between access routers (ARs) that act as points of attachment to the IP network. Access point (AP) or a base station is a Layer2 device that is connected to one or more access routers (ARs) and offers a wireless connection to the mobile node. Access point may be also implemented in the same entity as access router (AR). However, the handover latency and packet loss incurred by standard Mobile IP are quite high. It is desirable to provide seamless handovers (low latency and low packet loss) between access routers (ARs). Many seamless handover solutions however make an assumption that the mobile node MN and/or the current access router (AR) have a priori knowledge of the target of the handover (i.e., the next access router or target access router). In order to provide this information to these seamless handover solutions, a methodology is desired to discover geographically adjacent routers and to collect their capabilities.

Seamless handover solutions may be vulnerable toward Denial of Service (DoS) attacks. An example of this is that a malicious MN may send false reports to the new AR thereby filling up the new AR's cache with false information. This may lead to denial of service with respect to future requests. Another example is that a malicious MN may send a wrong request that may then be stored in the cache after being resolved. Similar to the first approach, the cache may get filled up by wrong entries.

SUMMARY OF THE INVENTION

Embodiments of the present invention may provide a method of handing over a mobile node from a first access router to a second access router. This may include sending a request message from the second access router to the mobile node and in response to the received request message, sending a connectivity report from the mobile node to the second access router. Additionally, prior to sending the request message from the second access router to the mobile node, the mobile node may obtain connectivity with the second access router by moving into a geographic location associated with the second access router.

The connectivity report may include an IP address of the first access router. The connectivity report may also include a Layer2, L2 identifier of the first access router. Alternatively, the connectivity report may also include a Layer2, L2 identifier of the access point attached to the first access router.

Sending the request message may include the second access router selecting one mobile node from a plurality of mobile nodes in order to send the request message. The one mobile node may be selected randomly from the plurality of mobile nodes.

Embodiments of the present invention may also include moving a mobile node from a first geographic location associated with a first access router to a second geographic location associated with a second access router. A request message may be sent from the second access router to the mobile node and a connectivity report may be sent from the mobile node to the second access router. Handover of the mobile node from the first access router to the second access router may be performed after or before sending the connectivity report.

Other objects, advantages and salient features of the invention will become apparent from the following detailed description taken in conjunction with the annexed drawings, which disclose preferred embodiments of the invention.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto.

The following represents brief descriptions of the drawings in which like reference numerals represent like elements and wherein.

DETAILED DESCRIPTION

Figure 1:
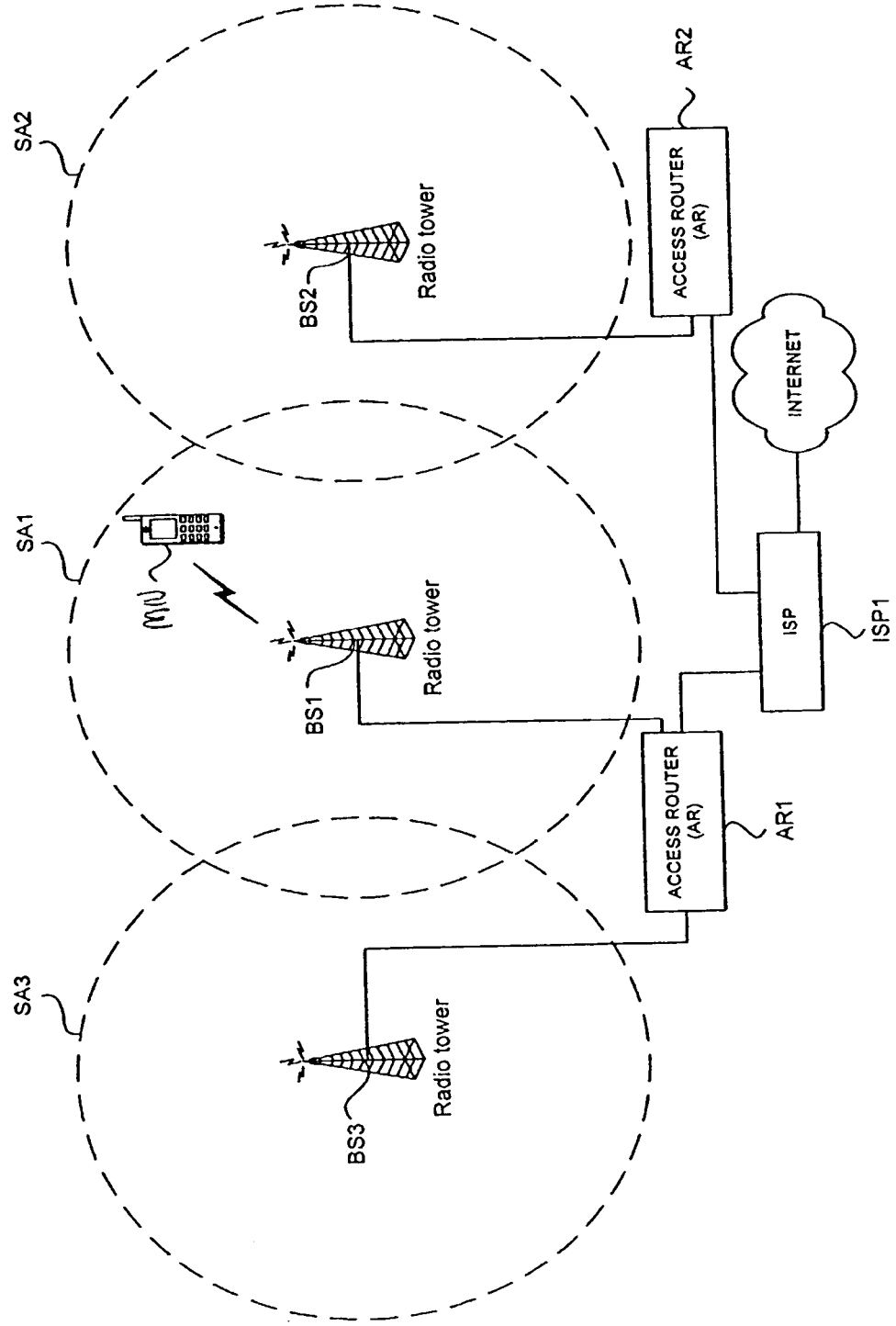
FIG. 1 shows a mobile IP network having three service areas according to an example arrangement.

In the following detailed description, like reference numerals and characters may be used to designate identical, corresponding or similar components in differing figure drawings. Further, arrangements may be shown in block diagram form in order to avoid obscuring the invention, and also in view of the fact that specifics with respect to implementation of such block diagram arrangements may be highly dependent upon the platform within which the present invention is to be implemented. That is, such specifics should be well within the purview of one skilled in the art.

An important issue for the mobile networks is the ability of seamless IP-layer mobility. Seamless mobility is the ability to hand a mobile node MN over to a new access router AR with minimal service disruption. In a mobile network, the access routers may not all be known to each other. Methodologies are therefore provided so that each access router AR may obtain information about other access routers. Discovering neighboring access routers within the access router's proximity allows seamless handovers in IP based mobile networks.

Embodiments of the present invention may provide a methodology of providing handover of a mobile node from a first access router associated with a first geographic location to a second access router associated with a second geographic location. A request message may be sent from the second access router to the mobile node MN once the mobile node MN has connectivity with the second (or new) access router. In response, the mobile node MN may send a connectivity report from the mobile node to the second access router.

FIG. 1 shows a mobile IP network that covers three service areas SA1, SA2 and SA3 according to one arrangement. Other arrangements are also possible. For the sake of simplicity, only IP services are shown, although separate transmission networks can be provided for example for voice services. As shown in FIG. 1, a mobile node (or mobile terminal, phone or device, or user equipment) MN is within the service area SA1 served by a base station BS1 (also called an access point or AP). The base station BS1 is connected to an access router AR1, which in turn connects to an Internet service provider ISP1 that provides access to the Internet. Other base stations such as BS3 may also be connected to access router AR1. One example for reasons for doing this is that a common IP address may be used for mobile terminals even though the terminals may pass through different service areas. In other words, although there may be a hand off of radio frequency channels when the mobile node MN moves between the service area SA1 and the service area SA3, it may not be necessary to change the IP address used to communicate with the mobile node MN because the Internet connection may still be served by the same access router AR1.

A second service area SA2 is served by a separate base station BS2, which is in turn connected to a different access router AR2. Due to the network topology, access routers AR1 and AR2 use different blocks of IP addresses for communicating with mobile nodes roaming within their associated service areas. If the mobile node MN moves from the service area SA1 to the service area SA2, a mechanism hands off the Internet connection from the access router AR1 to the access router AR2. Similarly, if the service areas SA1 and SA2 are separated by a large logical distance (e.g., AR1 and AR2 are connected to different ISPs), a coordination mechanism permits data transmitted to a terminal previously operating in the service area SA1 to be forwarded to the service area SA2 if the mobile node moves into the service area SA2.

Figure 2:
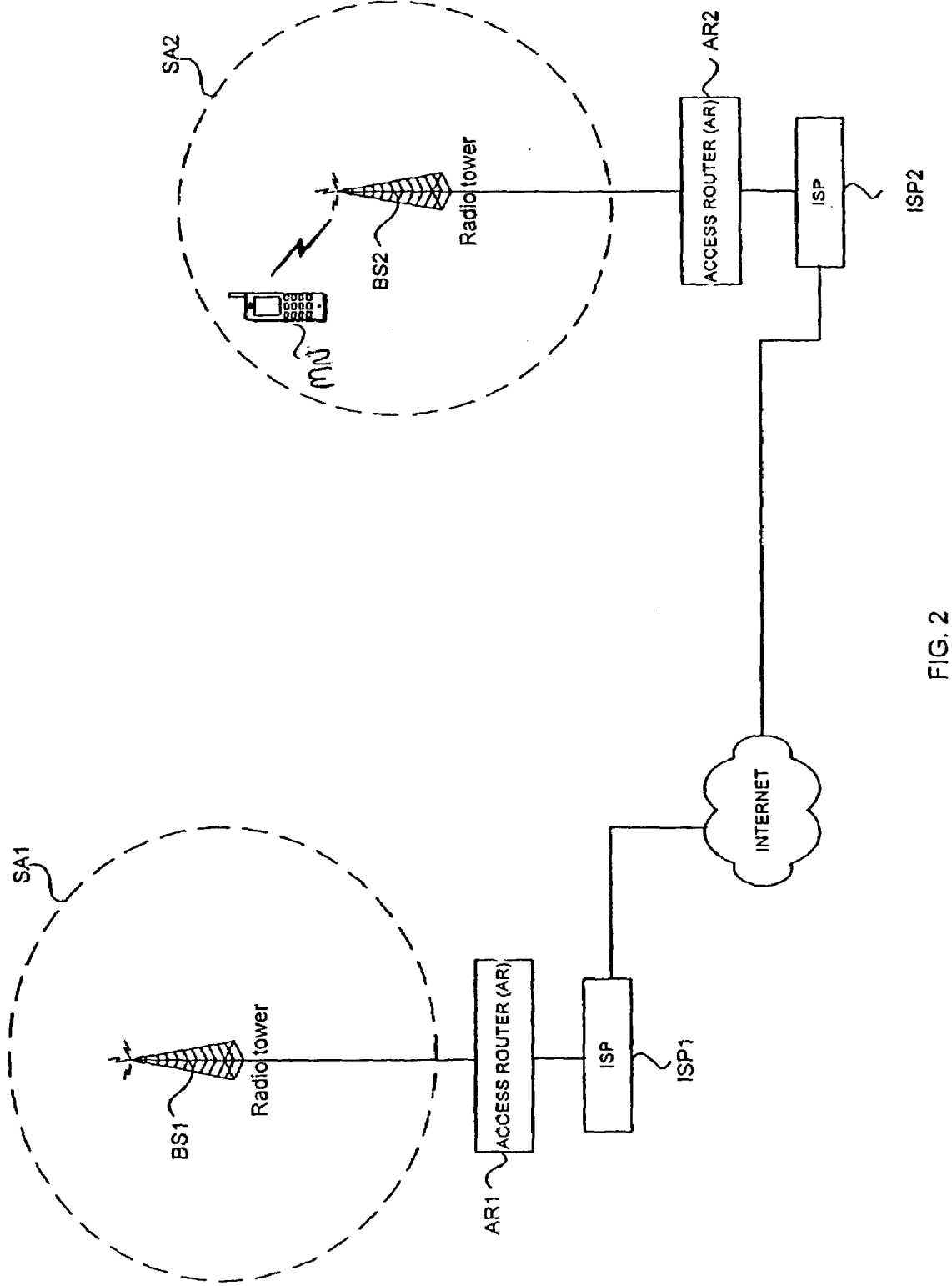
FIG. 2 shows handing off of IP connections according to an example arrangement.

FIG. 2 shows one methodology for handing off IP connections according to one arrangement. Other arrangements are also possible. The service area SA1 is served by the access router AR1, which is designated the "home agent" for communicating with the mobile node MN. While the mobile node MN moves within the service area SA1, the access router AR1 communicates with the mobile node MN using an IP address that is assigned to the access router AR1. IP packets (carrying data (e.g., e-mail, Web pages, and the like) from upper protocol layers) may be transmitted over the Internet to ISP1, which forwards the traffic to the access router AR1, which in turn knows that a particular IP connection is associated with the mobile node MN in its service area.

If the mobile node MN moves to a different service area SA2 served by a different access router AR2, then packets that were previously transmitted to access router AR1 will no longer reach the mobile node MN. One methodology is to advertise (e.g., broadcast) the existence of the access router AR2 in the service area SA2, such that when the mobile node MN moves into the service area SA2, the mobile node MN is notified of the existence of the access router AR2, and the mobile node MN receives a new IP address for communicating within the service area SA2. The mobile node MN or access router AR2 then sends a binding update to home agent AR1 so that home agent (i.e., the access router AR1) knows the IP address that will allow packets to reach the mobile node MN in the service area SA2. The home agent treats this address as a "care of" address, and all further packets to the original IP address are forwarded to the new IP address. In essence, two separate IP addresses may be used to communicate with the mobile node MN: a home agent address and a care of address that changes at each new point of attachment. This methodology is described in the Internet Engineering Task Force (IETF) Request for Comments (RFC) number 2002 (October 1996), the subject matter of which is incorporated herein by reference.

The above-described methodology assumes that the target access router (AR2) is known by the originating access router (AR1) prior to the handoff (e.g., the mobile node MN has accepted the advertisement from access router AR2 and is assigned an IP address for communicating with it). This is not always the case. Mobile nodes and access routers may therefore perform a candidate access-router discovery protocol. At least one example of Candidate Access Router Discovery is described in International Publication No. WO 03/003639 A2 to Chaskar et al., the subject matter of which is incorporated herein by reference. Candidate access-router discovery protocol may provide a reverse mapping from an access point (AP) layer-2 (L2) identifiers to IP addresses of supporting access routers. The protocol may also identify physically neighboring access routers sufficiently in advance of mobile node handover such that the access router capabilities may be exchanged. Additionally, this protocol may use these collected capabilities in addition to information provided by the mobile node, such as reachability and preferences, to aid the mobile node in selecting a target access router at or near the time of handover.

In order for an access router AR to be considered as a candidate for handover (i.e., a candidate AR), a coverage area of one or more of its attached access points overlaps with a coverage area of the mobile nodes MN's existing point of attachment. Two access routers ARs with overlapping coverage areas are considered to be geographically adjacent, or physical neighbors. Geographically adjacent routers may be separated by any number of IP hops, and may actually be in completely different domains. It is therefore important that geographically adjacent routers discover each others existence.

Geographically adjacent routers may be identified by the handover patterns of the mobile nodes. If a mobile node MN can handover between two access points, then the associated ARs may be considered as candidates for future handovers.

One methodology to obtain information regarding other access routers assumes that the mobile node MN sends connectivity reports to the new access router after obtaining the IP-level connectivity with the new access router. "Protocol for Candidate Access Router Discovery for Seamless IP-level Handovers", Work In Progress, Internet Draft, November 2001, by Trossen et al., the subject matter of which is incorporated herein by reference, describes one such methodology. The connectivity report may include information about the old access router and related information such as Layer2 identifier of the old access router. Another methodology relies on a central server that resolves Layer2 identifier to Layer3 identifiers (such as IP addresses). "Geographically Adjacent Access Router Discovery Protocol", Work In Progress, Internet Draft, November 2001, by Funato et al., the subject mater of which is incorporated herein by reference, describes one such methodology. These above-described methodologies may be vulnerable towards Denial of Service (DoS) attacks. More specifically, a malicious mobile node MN may send a false report to the new access router filling up the new access router's cache with false information. This may lead to denial of service with respect to future requests. The cache may therefore contain false information that cannot be used for resolving Layer2 identifiers to IP addresses. Additionally, a malicious mobile node MN may send a wrong Layer2 to Layer3 resolve request, which may then be stored in the cache after being resolved by a central server. The cache may similarly be filled up by wrong entries. The connectivity reports are sent based on unsolicited messages from the mobile node MN to the new access router. Due to the unsolicited nature of this messaging, a Denial of Service attack may be possible.

Embodiments of the present invention may provide a solution for Denial of Service attacks by having a new access router (associated with a new geographic location) send a request for a connectivity report from a particular mobile node after making connection. The new access router may also further implement certain selection policies to determine the particular mobile node (from a plurality of mobile nodes) before sending the request. This may help reduce the possibility of false entries in the local cache.

Embodiments of the present invention may implement connectivity reports through requests from the new access router to the mobile node MN. These connectivity reports may contain an IP address of the old access router and an L2 identifier of the old access point. More specifically, the new access router may send a message to the mobile node MN after the mobile node obtained IP-level connectivity with the new access router. As a response, the mobile node MN may send the new access router a message with the connectivity report information.

Figure 3:
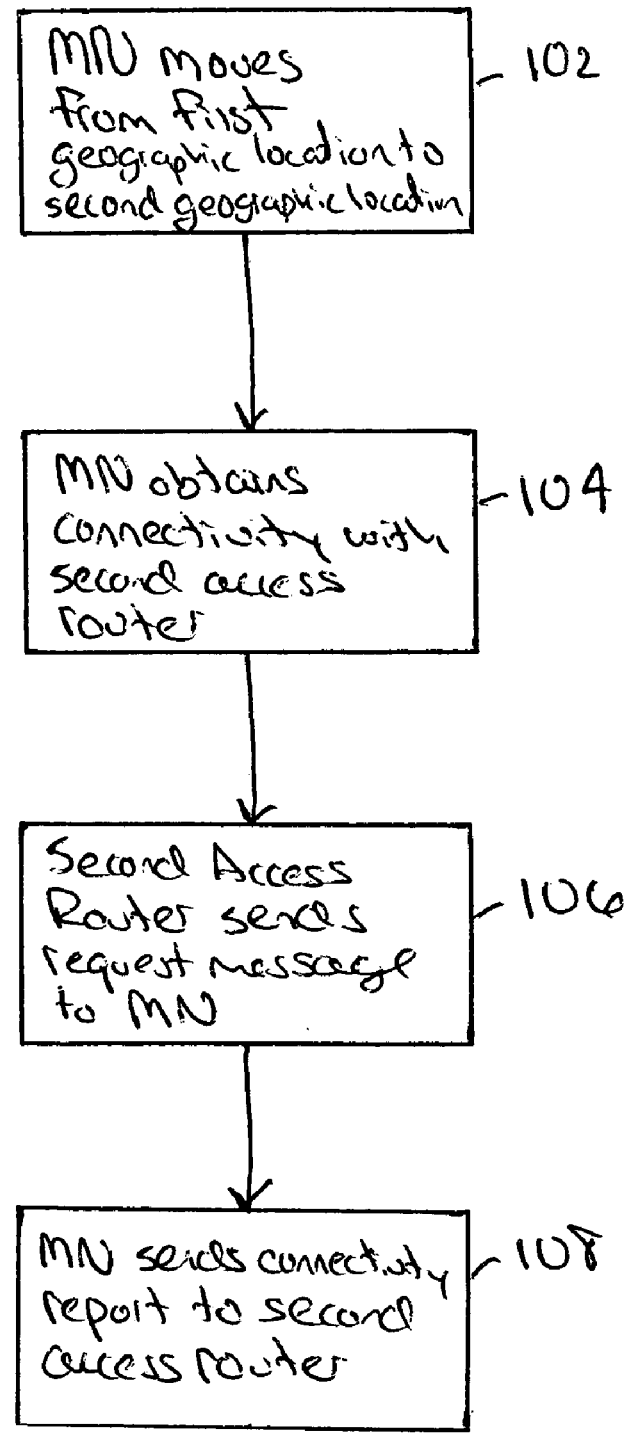
FIG. 3 is a flowchart showing operations involved in handing over a mobile node to a new access router according to an example embodiment of the present invention.

FIG. 3 is a flow chart showing operations involved in handing over a mobile node to a new access router according to an example embodiment of the present invention. Other operations, orders of operations and embodiment are also within the scope of the present invention. More specifically, in block 102, a mobile node MN may move from a first geographic location (associated with a first or old access router) to a second geographic location (associated with a second or new access router). In block 104, the mobile node MN may obtain connectivity with the second or new access router associated with the second geographic location. This connectivity may involve handing over the mobile node from the first access router to the second access router. The second or new access router may send a request message to the mobile node MN in block 106. In block 108, the mobile node MN may send a connectivity report to the second or new access router in response to a received request message.

Figure 4:
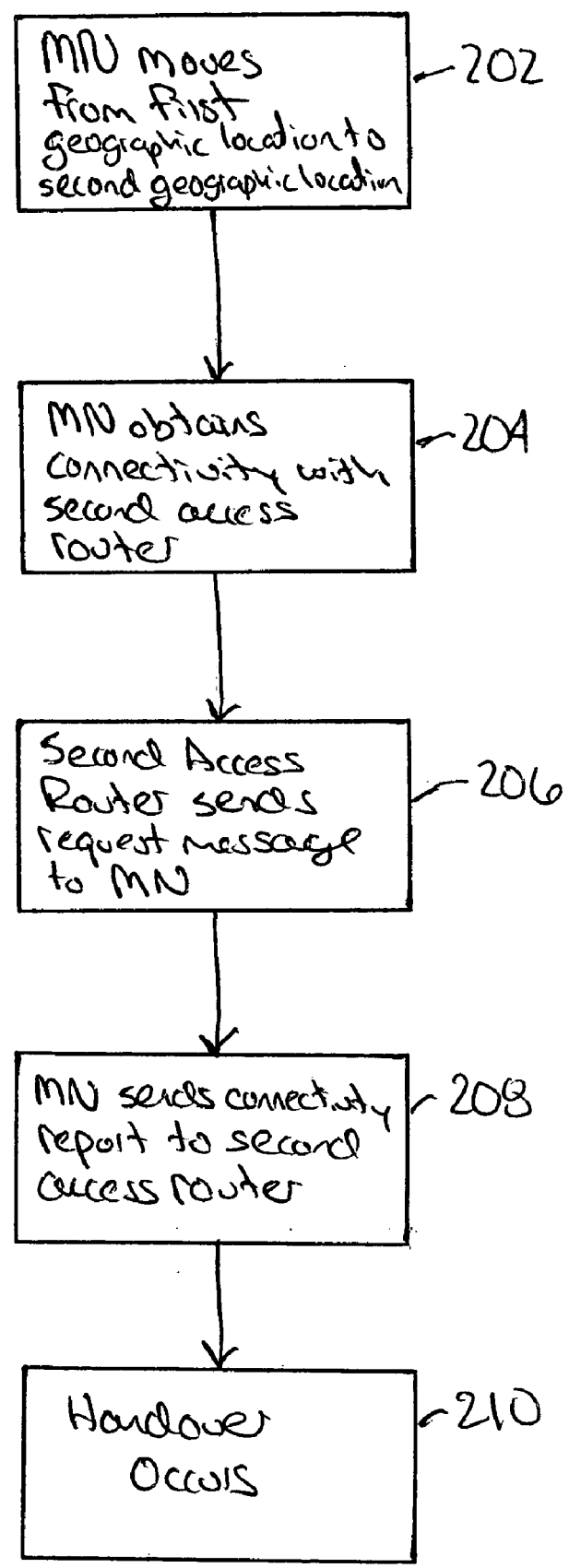
FIG. 4 is a flowchart showing operations involved in handing over a mobile node to a new access router according to an example embodiment of the present invention.

FIG. 4 is a flowchart showing operations involved in handing over a mobile node to a new access router according to an example embodiment of the present invention. Other operations, orders of operations and embodiments are also within the scope of the present invention. More specifically, in block 202, a mobile node MN may move from a first geographic location (associated with a first or old access router) to a second geographic location (associated with a second or new access router). In block 204, the mobile node MN may obtain connectivity with the second or new access router associated with the second geographic location. This connectivity may not be an actual handover of the mobile node from the first access router to the second access router. The second or new access router may send a request message to the mobile node MN in block 206. In block 208, the mobile node MN may send a connectivity report to the second or new access router in response to a received request message. Then in block 210, handover may occur from the first access router to the second access router.

As shown in FIG. 3, the connectivity report may be sent after the handoff occurs. Alternatively, as shown in FIG. 4, the connectivity report may be sent before handoff occurs.

Embodiments of the present invention may further implement selection policies for issuing the requests for connectivity reports. For example, the new access router may randomly choose a particular mobile node MN out of N mobile nodes to request the report. That is, the new access router may randomly pick a number n between 1 and N and wait for n mobile nodes to obtain connectivity with the new access router. The new access router may then request the connectivity report from the nth mobile node that obtained IP-level connectivity. The number N may depend, for example, on one or more of the following: (1) the strength of mobile node authentication; (2) the desire of the access router to react upon possible changes in physical topology; and (3) the size of the internal cache. For example, in a cellular system with fairly strong authentication (e.g. through a SIM card), the access router may request the reports from all or at least many (i.e., small N) mobile nodes. Additionally, if the access routers are physically added or removed from the network, the operator of the new access router may have the desire to obtain knowledge about these changes more or less fast (i.e., a small N may mean to obtain this knowledge faster than for larger Ns). The size of the internal cache may also be used as a factor since the connectivity reports are stored internally in a cache, and the new access router may increase N when the internal cache exceeds certain thresholds.

Embodiments of the present invention therefore drastically reduce the possibility for Denial of Service attacks in a candidate access router discovery process. Rather than enabling any mobile node MN to inject false connectivity reports into the access router, the new access router may select the mobile node to send the connectivity report. The selection may also depend on operator-specific policies.

Embodiments of the present invention are applicable to handoff (or handover) of the mobile node occurring prior to the connectivity report being sent. In other words, the mobile node may obtain connectivity with a new (or second) access router prior to the connectivity report being sent to the new (or second) access router. Embodiments of the present invention are also applicable to the connectivity report being sent prior to handoff (or handover) of the mobile node. In this situation, the mobile node may have connectivity with the mobile node and send the connectivity report prior to actual handoff of the mobile node.

The term "mobile node" should be understood to include, for example, IP-enabled cellular telephones, wirelessly accessible Personal Digital Assistants (PDAs); notebook computers that can communicate wirelessly; and other mobile devices that can communicate using communications over various transmission technologies (including CDMA, WCDMA, GSM, TDMA and other) or media (radio, infrared, laser, and the like).

The term "access router" should be understood to include computer-implemented devices that route packets, such as IP packets, to addresses in a network based on routing information. Access routers may be distinct from base stations/access points, which may rely on different transmission schemes to transmit information (e.g., GSM or CDMA). One or more base stations may be associated with a single access router. Alternatively, more than one access router may be associated with a single base station.

Any reference in this specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment or component, it is submitted that it is within the purview of one skilled in the art to effect such feature, structure, or characteristic in connection with other ones of the embodiments and/or components. Furthermore, for ease of understanding, certain method procedures may have been delineated as separate procedures; however, these separately delineated procedures should not be construed as necessarily order dependent in their performance, i.e., some procedures may be able to be performed in an alternative ordering, simultaneously, etc.

Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A method, comprising:
   sending a request message from a second access router to a mobile node;
   in response to the request message, sending a connectivity report from the mobile node to the second access router, wherein the sending the connectivity report comprises providing the second access router with information about a first access router though the connectivity report; and
   handing over the mobile node from the first access router to the second access router.

2. The method of claim 1, further comprising:
   prior to the sending the request message from the second access router to the mobile node, obtaining, by the mobile node, connectivity with the second access router by moving into a geographic location associated with the second access router.

3. The method of claim 1, wherein the sending the connectivity report comprises sending an internet protocol address of the first access router.

4. The method of claim 3, wherein the sending the connectivity report comprises sending a layer two identifier of the first access router.

5. The method of claim 3, wherein the sending the connectivity report comprises sending a layer two identifier of an access point attached to the first access router.

6. The method of claim 1, wherein the sending the request message comprises selecting, by the second access router, one mobile node from a plurality of mobile nodes to send the request message.

7. The method of claim 6, wherein the selecting the one mobile node comprises selecting the one mobile node randomly from the plurality of mobile nodes.

8. The method of claim 1, further comprising:
   performing the handing over the mobile node from the first access router to the second access router after sending the connectivity report.

9. The method of claim 1, further comprising:
   performing the handing over the mobile node from the first access router to the second access router before sending the connectivity report.

10. The method of claim 1, further comprising:
    obtaining, by the mobile node, internet protocol connectivity with the second access router,
    wherein the sending the request message occurs after the obtaining, by the mobile node, the internet protocol connectivity with the second access router.

11. A method comprising:
    moving a mobile node from a first geographic location associated with a first access router to a second geographic location associated with a second access router;
    sending a request message from the second access router to the mobile node; and
    sending a connectivity report from the mobile node to the second access router,
    wherein the sending the connectivity report comprises providing the second access router with information about the first access router through the connectivity report.

12. The method of claim 11, further comprising:
    prior to the sending the request message from the second access router to the mobile node, obtaining, by the mobile node, connectivity with the second access router.

13. The method of claim 11, wherein the sending the connectivity report comprises sending an internet protocol address of the first access router.

14. The method of claim 13, wherein the sending the connectivity report comprises sending a layer two identifier of the first access router or a layer two identifier of an access point connected to the first access router.

15. The method of claim 11, wherein the sending the request message comprises selecting, by the second access router, one mobile node from a plurality of mobile nodes to send the request message.

16. The method of claim 15, wherein the selecting the one mobile node comprises selecting the one mobile node randomly from the plurality of mobile nodes.

17. The method of claim 11, further comprising:
    performing the handing over the mobile node from the first access router to the second access router after sending the connectivity report.

18. The method of claim 11, further comprising:
performing the handing over the mobile node from the first access router to the second access router before sending the connectivity report.

19. The method of claim 11, further comprising:
obtaining, by the mobile node, internet protocol connectivity with the second access router,
wherein sending the request message occurs after the obtaining, by the mobile node, the internet protocol connectivity with the second access router.

20. A mobile internet protocol network, comprising:
a first access router;
a second access router coupled to the first access router; and
a mobile node,
wherein the second access router is configured to send, upon the mobile node moving to a geographic location associated with the second access router, a request message to the mobile node requesting a connectivity report, and
wherein the mobile node is configured to provide the second access router with information about the first access router though the connectivity report.

21. The network of claim 20, wherein the mobile node is configured to send the connectivity report to the second access router in response to receiving the request message sent from the second access router.

22. The network of claim 21, wherein the connectivity report includes an internet protocol address of the first access router.

23. The network of claim 22, wherein the connectivity report further includes a layer two identifier of the first access router or a layer two identifier of an access point connected to the first access router.

24. The network of claim 21, wherein the network is configured to hand the mobile node over from the first access router to the second access router before the mobile node sends the connectivity report.

25. The network of claim 21, wherein the network is configured to hand the mobile node over from the first access router to the second access router after the mobile node sends the connectivity report.

26. The network of claim 20, wherein the second access router is configured to select one mobile node from a plurality of mobile nodes to request the connectivity report.

27. The network of claim 26, wherein the second access router is configured to select the one mobile node randomly from the plurality of mobile nodes.

28. The mobile internet protocol network of claim 20, wherein:
the mobile node is configured to obtains IP-internet protocol connectivity with the second access router, and
the mobile node is configured to send the request message after the mobile node has obtained the internet connectivity with the second access router.

29. An access router, comprising:
a processor configured to execute computer-readable instructions for performing
handing over a mobile node from another access router;
sending a request message to the mobile node; and
receiving a connectivity report from the mobile node,
wherein the receiving the connectivity report comprises receiving information about the another access router.

30. The access router of claim 29, wherein the processor is configured to send the request message after the mobile node moves from a first geographic location associated with the another access router to a second geographic location associated with the access router.

31. The access router of claim 29, wherein the processor is configured to perform the handing over the mobile node prior to the receiving the connectivity report.

32. The access router of claim 29, wherein the processor is configured to perform the handing over the mobile node after the receiving the connectivity report.

33. The access router of claim 29, wherein the sending the request message comprises selecting one mobile node from a plurality of mobile nodes to send the request message.

34. The access router of claim 33, wherein the selecting the one mobile node comprises selecting the mobile node randomly from the plurality of mobile nodes.

35. The access router of claim 29 wherein:
the mobile node is configured to obtain internet protocol connectivity with the access router, and
the processor is configured to perform the sending the request message after the mobile node has obtained the internet protocol connectivity with the access router.

36. A mobile internet protocol network, comprising:
a first means for access routing;
a second means for access routing coupled to the first means for access routing; and
a mobile means for communicating,
wherein the second means for access routing is configured to send, upon the mobile means for communicating moving to a geographic location associated with the second means for access routing, a request message to the mobile means for communicating requesting a connectivity report, and
wherein the mobile means for communicating is configured to provide the second means for access routing with information about the first means for access routing through the connectivity report.

* * * * *